H. C. MORRIS.
GAS METER ATTACHMENT.
APPLICATION FILED JUNE 28, 1916.
1,228,467.
Patented June 5, 1917.
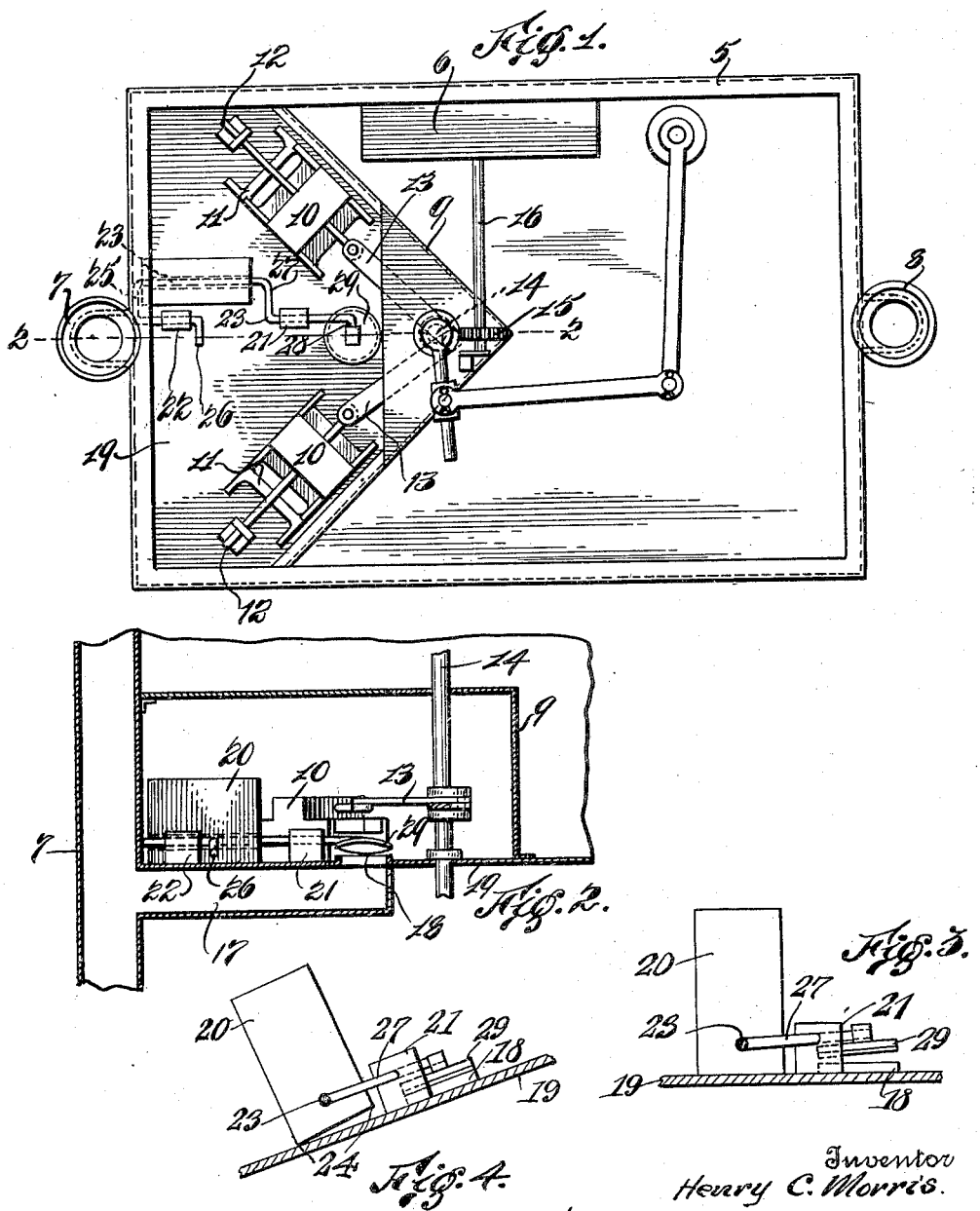
Inventor
Henry C. Morris.
By his Attorney

UNITED STATES PATENT OFFICE.

HENRY C. MORRIS, OF DALLAS, TEXAS.

GAS-METER ATTACHMENT.

1,228,467.  Specification of Letters Patent.  Patented June 5, 1917.

Application filed June 28, 1916. Serial No. 106,314.

*To all whom it may concern:*

Be it known that I, HENRY C. MORRIS, a citizen of the United States, and a resident of the city of Dallas, in the county of Dallas and State of Texas, have invented certain new and useful Improvements in Gas-Meter Attachments, of which the following is a specification, reference being made to the accompanying drawings, forming a part thereof.

My invention relates to attachments for gas or other fluid meters designed to operate with sliding valves which open and close ports to permit gas or other fluid to go in and out of diaphragm chambers, which in turn operate the registering mechanism for the measurement of gas that may pass through the meter.

In meters of that type wherein the measurement of gas is accomplished by means of sliding valves and diaphragms, operating registering mechanism of the meter, the valve covers operate unrestrictedly upon their seats, being normally held in place by their weight or by gravity. Therefore, while the meter is maintained in an upright position, the valve covers will remain properly seated and operate the mechanism for measuring flow of gas through the meter.

If, however, in this or similar types of meter, the meter be dislodged or moved from its normal upright position, the valve covers will be unseated and gas will pass through the meter without actuating the valves and without causing a registration of the flow of gas through the meter.

The objects of my invention, among other things, are to provide a simple and effective automatically-actuated device in conjunction with a valve located within the valve case and coacting with the short inlet pipe of a meter, whereby such valve, which is normally held open when the meter is maintained in its usual upright position, will be immediately closed to shut off the inflow of gas to the valve case whenever the meter is accidentally or purposely tipped or tilted from its normal vertical position. In the embodiment illustrated, I have arranged a weight of suitable shape and size which shall shift or tilt when the meter is moved from its upright position, the weight, by its movement, actuating a crank arm suitably disposed to automatically close the valve on its seat formed on the orifice of the inlet pipe to the valve casing, whenever such weight shall be shifted or tilted, and to open the valve when the meter is restored to its normal position.

Other objects and advantages of my improved attachment will be hereinafter set forth and particularly pointed out in the appended claims.

In the accompanying drawings, Figure 1 is a top plan view of a meter provided with the shut-off valve, the cover of the valve case being removed;

Fig. 2 is a fragmentary sectional view of the upper portion of a meter, the section being taken on the line 2—2 shown in Fig. 1, the cover of the valve case being shown in position;

Fig. 3 is an enlarged sectional view illustrating the shut-off valve in normal position; and Fig. 4 is a view similar to Fig. 3, illustrating the meter tipped and the shut-off valve closed.

Similar numerals refer to similar parts throughout the several figures.

In the drawings, 5 indicates the gas meter having the register 6 secured to one side thereof, with the inlet pipe 7 and the outlet pipe 8 oppositely disposed to each other, as shown in Fig. 1. The mechanism for operating the register 6 is of well-known construction and arrangement within the valve case 9, and comprises the valve covers 10 sliding on the valve seats 11, which covers 10 carry rods 12 connected in turn by links 13 to a vertically disposed shaft 14 which is rotated by the diaphragms in the meter (not shown), through suitable arms and links, to rotate the gear wheel 15 mounted on the shaft 16 connected with the registering devices in the register 6. As this mechanism constitutes, in itself, no part of my invention, and is old and well-known, its construction and operation need not be described.

The inlet pipe 7 has the short inflow pipe 17 connected at right angles therewith, the inner end of which, projecting into the valve case 9, forms the valve seat 18 preferably just above the floor 19 of the valve case 9, as shown in Fig. 2. On the floor 19 of the valve case 9 is the weight 20, loosely supported thereon and normally resting in an upright position within the valve case, as shown in Fig. 3. Arranged on two sides of the weight 20, are two bearing blocks 21 and 22, each secured to the floor 19 substantially in the positions shown in Fig. 1. The weight 20 carries the crank arm 23, journaled in the lower portion of the weight, preferably midway between its lower bearing edges 24. The end 25 of the arm 23 extends at substantially right angles from the side edge 24 of the weight 20, and is then bent to pass through the bearing block 22 and terminates in the right angled free arm 26, which is adapted to be lifted from, and lowered to, the floor 19 as the position of the weight 20 is changed from the tipping of the meter, the arm 26 being uplifted when the weight 20 is in its vertical position, as shown in Fig. 2. The other end 27 of the crank arm 23 is bent to extend diagonally upward from the weight 20, as shown in Fig. 3, and thence passes through the bearing block 21, whose bearing is slightly higher from the floor 19 than the bearing of the arm 23 within the weight 20, as is clearly shown in Fig. 3, when the weight 20 is in its normal upright position. After passing through the block 21, the end 27 is bent at substantially right angles and carries on its outer end 28 the valve 29 adapted, when lowered, to engage the valve seat 18 on the inflow pipe 17, the valve being held uplifted when the meter and weight 20 are held in vertical position.

Whenever the weight 20 is tipped or tilted through the abnormal movement of the meter from its vertical position, such tilting movement raises the axis of the crank arm 23 within the weight 20 to the level of the axis of the bearing within the block 21, thereby forcing the valve 29 down on its seat 18, as is clearly shown in Fig. 4, from its normal uplifted position shown in Fig. 3, when the weight 20 rests horizontally on the floor 19, the meter being maintained in its normal upright position. On the other hand, when the weight 20 is tilted, as shown in Fig. 4, so as to close the valve 29 to shut off the inflow of gas from the pipe 17 to the valve case 9, its further movement from the perpendicular is prevented by the arm 26 being lowered from its normal uplifted position to rest on the floor 19, thereby limiting the tilting of the weight 20 after the valve 29 has been closed.

It will be apparent that my attachment serves to immediately and effectively shut off the inflow of gas to the valve case of the meter, whereby the register and its operating mechanism are caused to stop operating, whenever the meter is tipped or tilted from its normal upright position, either from accident or design; and that, further, I have provided a simple device to limit the tilting movement of the weight after the latter has performed its function in lowering the valve upon its seat on the inflow pipe.

It will be understood that the mechanism shown may be variously modified and changed without departing from the limits and advantages of my invention, provided the operation is substantially as indicated; and it will also be understood that the invention is not limited to any particular form or construction of the parts except in so far as such limitations are specified in the claims.

I claim as my invention:

1. In a gas meter attachment, the combination with the valve case of the meter, of means for admitting gas to said valve case, and means capable of tilting in opposite directions, maintained in inoperative position when the meter is in its normal upright position, for closing said gas-admission means when the meter is tilted in either of said opposite directions from its upright position.

2. In a gas meter attachment, the combination with the valve case of the meter having an inflow pipe, of a normally open valve for said pipe, and means capable of tilting in opposite directions, maintained in inoperative position when the meter is in its normal upright position, for closing said valve when the meter is tilted in either of said opposite directions from its upright position.

3. In a gas meter attachment, the combination with the valve case of the meter, of means for admitting gas to said valve case, means capable of tilting in opposite directions, maintained in inoperative position when the meter is in its normal upright position, for closing said gas-admission means when the meter is tilted in either of said opposite directions from its upright position, and means for limiting the movement of said closing means.

4. In a gas meter attachment, the combination with the valve case of the meter having an inflow pipe, of a normally open valve for said pipe, means capable of tilting in opposite directions, maintained in inoperative position when the meter is in its normal upright position, for closing said valve when the meter is tilted in either of said opposite directions from its upright position, and means for limiting the movement of said valve-closing means.

5. In a gas meter attachment, the combination with the valve case of the meter having an inflow pipe, of a valve seating on said pipe, a crank arm normally supporting said valve off its seat, and a weight whose base loosely rests on the floor of said valve case to support said crank arm when the floor is maintained in horizontal position, said members being disposed so that the weight shifts to operate the crank arm to force said valve on its seat when the meter is tilted.

6. In a gas meter attachment, the combination with the valve case of the meter having a inflow pipe, of a valve seating on said pipe, a crank arm normally supporting said valve off its seat, a weight whose base loosely rests on the floor of said valve case to support said crank arm when the floor is maintained in horizontal position, said members being disposed so that the weight shifts to operate the crank arm to force said valve on its seat when the meter is tilted, and means for limiting the shifting of said weight when said valve is seated on said pipe.

7. In a gas meter attachment, the combination with the valve case of the meter having an inflow pipe, of a valve seating on said pipe, a crank arm normally supporting said valve off its seat, a weight whose base loosely rests on the floor of said valve case to support said crank arm when the floor is maintained in horizontal position, said members being disposed so that the weight shifts to operate the crank arm to force said valve on its seat when the meter is tilted, and means, connected with said crank arm, for limiting the shifting of said weight when said valve is seated on said pipe.

8. In a gas meter attachment, the combination with the valve case of the meter having an inflow pipe, of a valve seating on said pipe, a crank arm normally supporting said valve off its seat, a weight whose base loosely rests on the floor of said valve case to support said crank arm when the floor is maintained in horizontal position, said members being disposed so that the weight shifts to operate the crank arm to force said valve on its seat when the meter is tilted, and means, connected with said crank arm and operating simultaneously therewith, for limiting the shifting of said weight when said valve is seated on said pipe.

HENRY C. MORRIS.

Witnesses:
F. E. TAYLOR,
W. A. REIBER.